June 14, 1938.  C. W. SINCLAIR  2,120,631
WHEEL
Filed Feb. 23, 1932   5 Sheets-Sheet 1
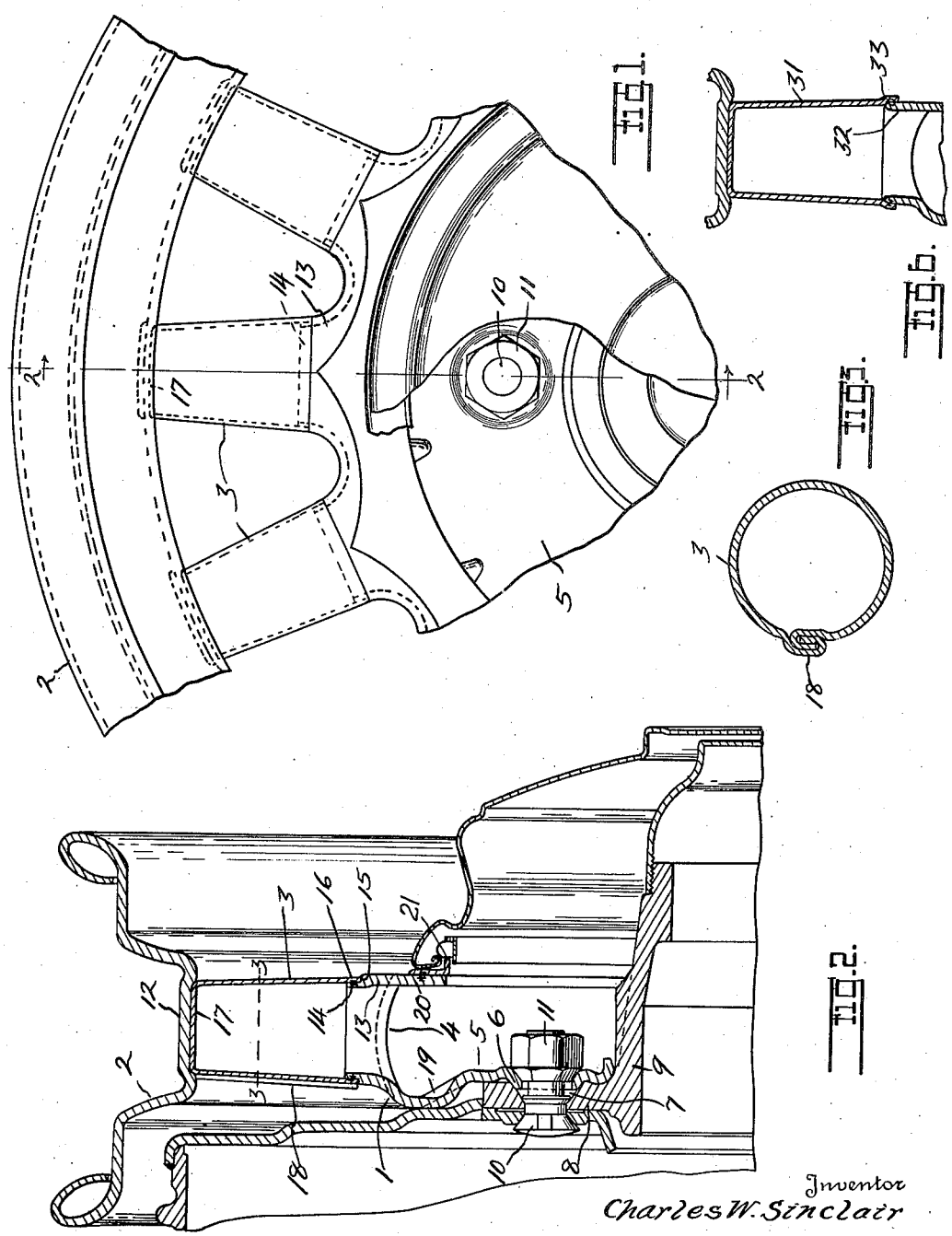
Inventor
Charles W. Sinclair June 14, 1938. C. W. SINCLAIR 2,120,631
WHEEL
Filed Feb. 23, 1932 5 Sheets-Sheet 2
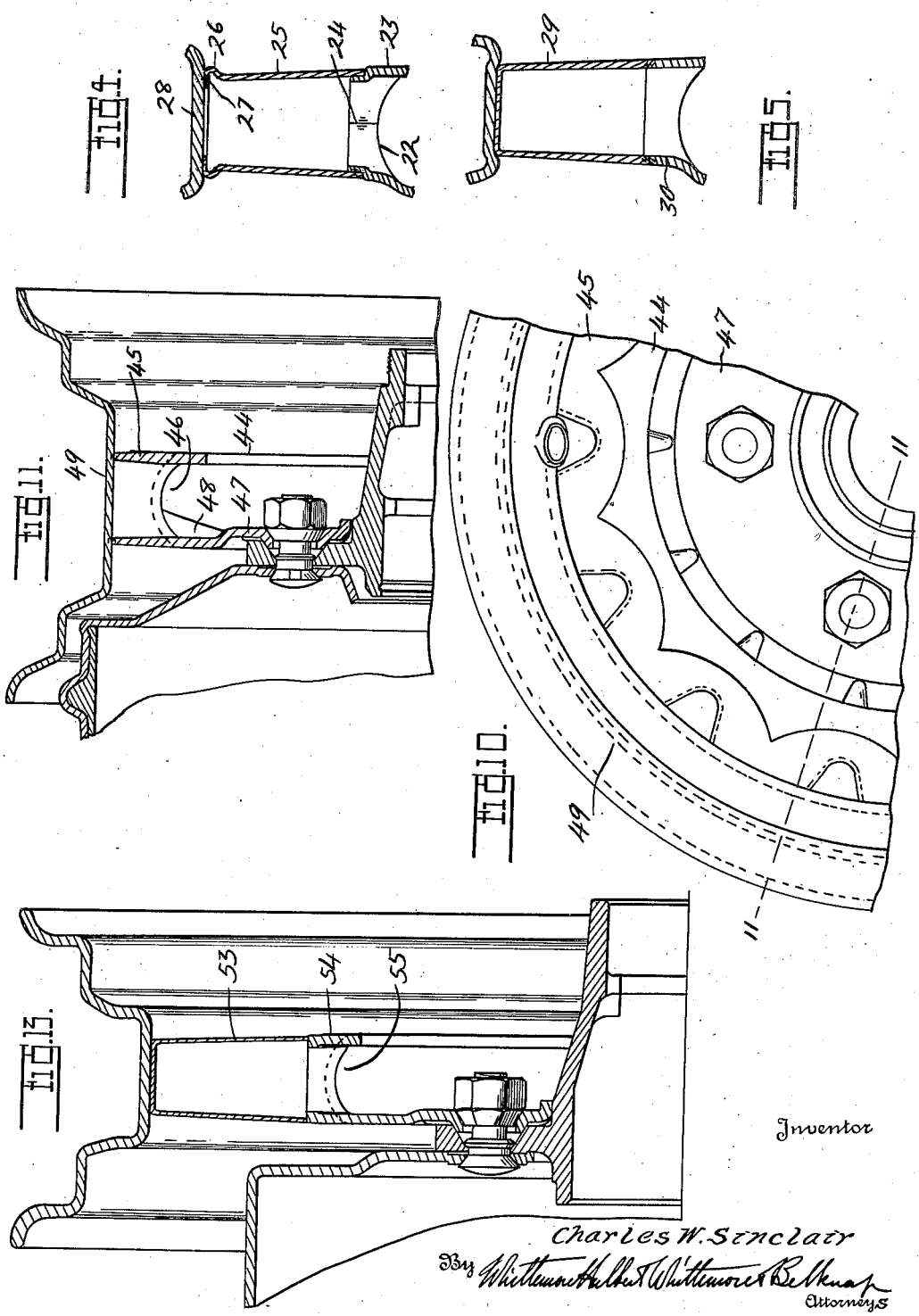
Inventor
Charles W. Sinclair June 14, 1938.  C. W. SINCLAIR  2,120,631
WHEEL
Filed Feb. 23, 1932  5 Sheets-Sheet 3
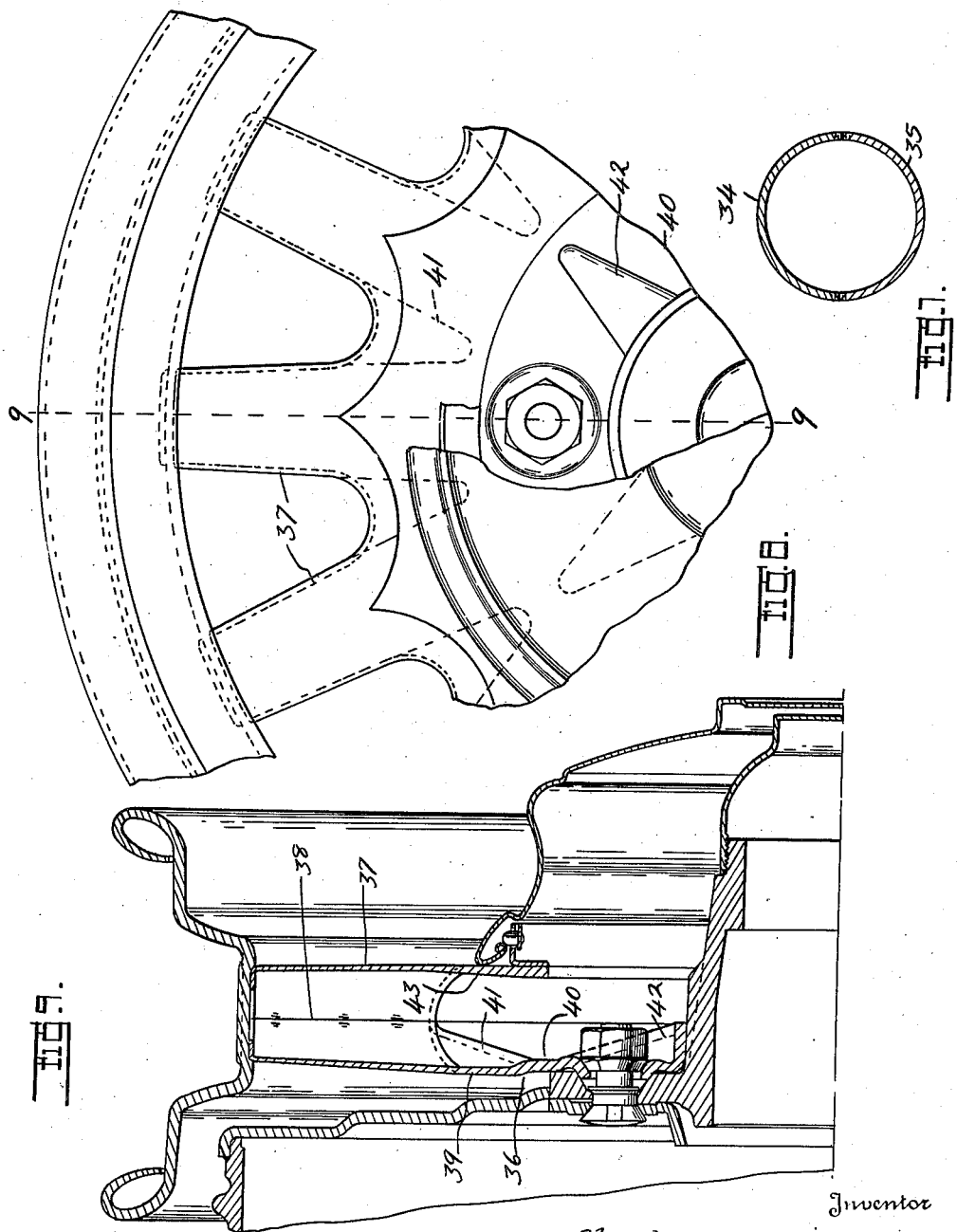
Inventor
Charles W. Sinclair June 14, 1938. C. W. SINCLAIR 2,120,631
WHEEL
Filed Feb. 23, 1932 5 Sheets-Sheet 4
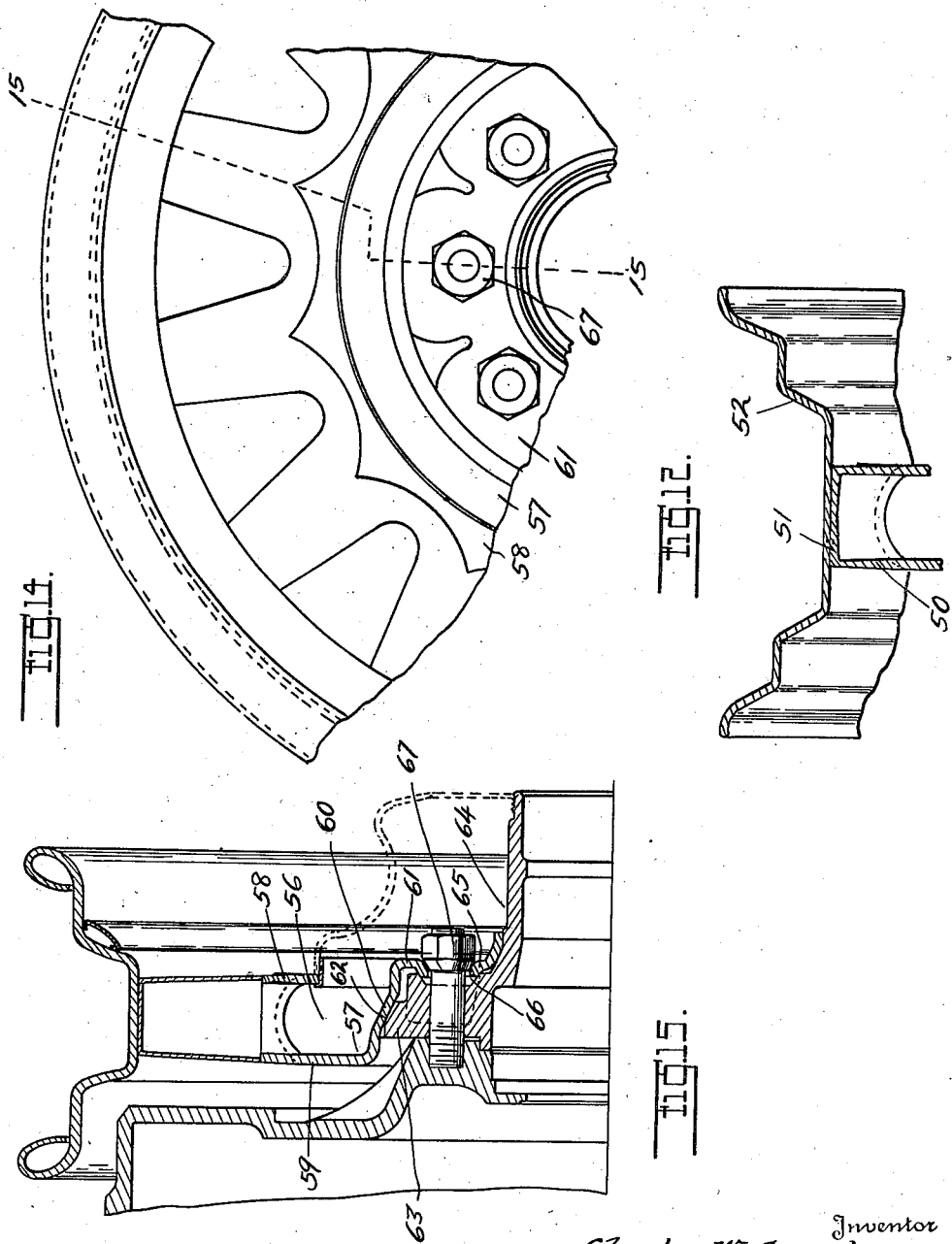

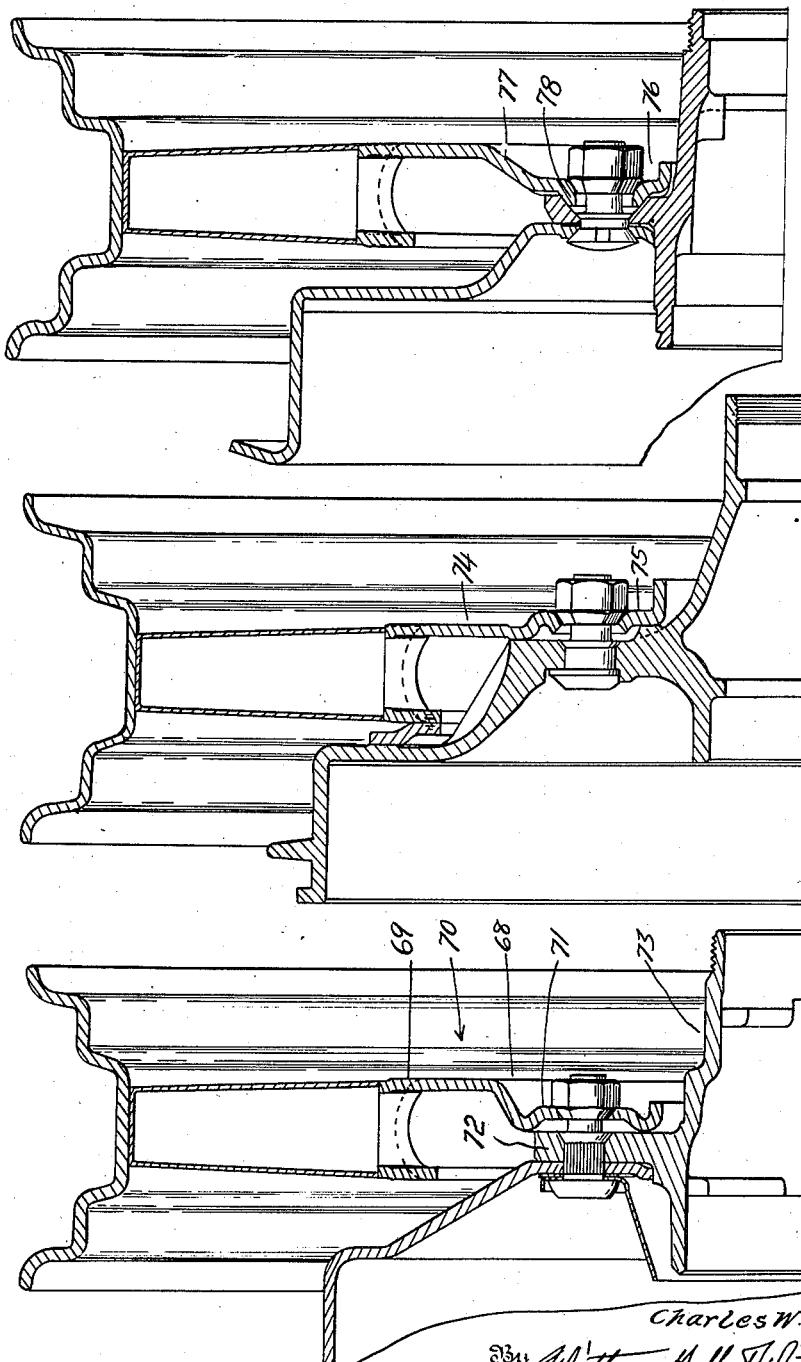

Patented June 14, 1938

2,120,631

UNITED STATES PATENT OFFICE 2,120,631

WHEEL

Charles W. Sinclair, Detroit, Mich., assignor, by mesne assignments, to The Kelsey-Hayes Wheel Company, Detroit, Mich., a corporation of Delaware Application February 23, 1932, Serial No. 594,685

7 Claims. (Cl. 301—9)

The invention relates to wheels and refers more particularly to wheels of the artillery type adapted for use particularly with motor vehicles. The invention has for one of its objects to provide an improved construction of artillery type wheel which may be economically manufactured. Other objects are to so construct the wheel that it may be demounted from the inner hub member; to so construct the wheel that the outer hub member has integral spoke forming portions; to so construct the wheel that the outer hub member has an inwardly extending wall for mounting the wheel upon the inner hub member; and to so construct the wheel that the means for securing the wheel to the inner hub member may be enclosed within the outer hub member of the wheel.

These and other objects of the invention will become apparent from the following description, taken in connection with the accompanying drawings, in which Figure 1 is a front elevation, partly broken away, of a wheel showing an embodiment of my invention;

Figure 2 is a cross section on the line 2—2 of Figure 1;

Figure 3 is a cross section on the line 3—3 of Figure 2;

Figures 4, 5 and 6 are views similar to a portion of Figure 2 showing other embodiments of my invention;

Figure 7 is a view similar to Figure 3 showing another embodiment of my invention;

Figure 8 is a front elevation, partly broken away, of a wheel showing another embodiment of my invention;

Figure 9 is a cross section on the line 9—9 of Figure 8;

Figure 10 is a front elevation, partly broken away, of a wheel showing another embodiment of my invention;

Figure 11 is a cross section on the line 11—11 of Figure 10;

Figure 12 is a view similar to Figure 11, showing another embodiment of my invention;

Figure 13 is a view similar to Figure 2, showing another embodiment of my invention;

Figure 14 is a view similar to Figure 1, showing another embodiment of my invention;

Figure 15 is a cross section on the line 15—15 of Figure 14;

Figures 16, 17 and 18 are views similar to Figure 2, showing other embodiments of my invention.

The wheel embodying my invention is a demountable sheet metal wheel of the artillery type and this wheel comprises the outer hub member 1, the rim member 2 and the spokes 3. The outer hub member is formed of sheet metal and has the peripheral annular portion 4 and the inwardly extending mounting portion 5, which latter extends radially inwardly from the rear edge and forms a continuation of the rear wall of the annular portion 4. This mounting portion is in the nature of an internal annular flange and it is provided with the annular series of driving projections 6. These driving projections are tapered and extend rearwardly and are adapted when the wheel is mounted upon the inner hub member to engage the tapered recesses 7 in the fixed flange 8 of this inner hub member 9. For detachably securing the wheel to the inner hub member, suitable securing members extending through the projections 6 are provided, these securing members being the bolts 10 and the nuts 11. With this construction, it will be noted that the nuts 11 are enclosed within the outer hub member. The rim member is a metal tire carrying rim of the drop-center type having the radially outwardly depressed portions 12 in the base of its well providing sockets for receiving the outer ends of the spokes 3. The spokes 3 are also formed of sheet metal and are tubular, the walls of these spokes preferably progressively decreasing in thickness from their inner to their outer ends.

The outer hub member 1 has its peripheral annular portion 4 formed to provide integral angularly spaced spoke forming portions which are also arranged to receive the spokes 3. In detail, this annular portion has the drawn angularly spaced radially and outwardly extending tubular portions 13 which form the spoke inner end portions of the wheel and the reduced outer ends 14 for telescopically engaging within the inner ends of the spokes 3. These spoke ends abut the annular shoulders 15 formed by the reduced ends and the front faces of the spokes extend substantially flush with the front faces of the tubular portions 13. The ends of the spokes are fixedly secured to the tubular portions as by being welded thereto at 16. The spokes 3 preferably have at their outer ends the transverse flanges 17 which close the spokes. The rim member 2 is fixedly secured upon the spokes by preferably shrinking the rim member upon the outer ends which enter the sockets formed by the outwardly depressed portions 12.

As shown particularly in Figure 3, each spoke 3 is formed from a single blank, the edges of which are crimped together at 18 and secured as by welding.

The outer hub member is preferably reinforced as by means of the radially extending ribs 19 in the mounting portion 5 and this outer hub member has its peripheral annular portion 4 preferably provided with the inturned reinforcing annular flange 20 at its front edge upon the front face of which flange is secured the hub cap mounting members 21.

Figure 4 discloses another embodiment of my invention in which the peripheral annular portion 22 of the outer hub member 23 of the demountable wheel is formed in two integrated sections, the angularly spaced outwardly and radially extending portions of these sections being welded together at 24 and forming the spoke inner end portions and also the receiving portions for the separately formed spokes. Also in this modification the tubular spokes 25 have their outer ends formed with the annular bead 26 terminating in the inturned transverse flange 27. The rim member 28 has the base of its well welded to this flange 27 for securing the rim member to the spokes.

As shown in Figure 5, the inner ends of the tubular spokes 29 are bevelled, as are also the outer ends of the tubular portions 30 of the outer hub member, and these bevelled ends register and are preferably welded together.

As disclosed in Figure 6, the inner end portions of the tubular spokes 31 are enlarged to telescopically engage over the tubular portions 32 of the outer hub member, the shoulders 33 formed between the enlarged and adjacent portions of the spokes abutting the outer ends of the tubular portions and properly positioning the parts. The telescoping portions are preferably welded together.

Each of the tubular spokes, instead of being formed in a single blank, may be formed, as shown particularly in Figure 7, of the cooperating or complementary sheet metal sections 34 and 35, the edges of which are preferably secured together as by being welded. These spokes may be secured to the outer hub member and the rim member with the joints between their sections at the front and rear of the spokes so that they may be more readily finished.

Figures 8 and 9 disclose another modification of artillery type wheel in which the outer hub member 36 and the tubular spokes 37 are formed of cooperating or complementary front and rear sheet metal sections which are welded at 38 along their adjacent edges and the thickness of which preferably progressively decreases from their inner to their outer edges. The outer hub member has the annular portion 39 and the integral rear internal radially extending mounting portion 40 in the nature of a flange or wall and the outer hub member is preferably reinforced by the ribs 41 which extend radially of the mounting portion and merge into the annular portion between adjacent spokes. The mounting portion is also preferably reinforced by the radially extending ribs 42. The outer hub member further has the front inwardly extending annular flange 43 to which is secured the hub cap mounting means. With this construction the rear portions of the spokes 37, the rear portion of the annular portion 39 and the mounting portion 40, with the reinforcing ribs 41 and 42, are all integral and formed in the rear section. The arrangement is such that the means for securing the wheel to the inner hub is enclosed within the outer hub member and a strong, substantial construction of wheel is secured.

Figures 10 and 11 disclose another modification of artillery type metal wheel in which the outer hub member 44 and the tubular spokes 45 are formed integral with each other from a single sheet metal blank. The outer hub member has the annular portion 46 and the rear internal radially extending mounting portion 47, which portions are reinforced by means of the radially extending ribs 48, which ribs merge into the annular portion between adjacent spokes. The outer hub member and spokes are formed in suitable apparatus which is designed to draw the metal from the annular portion radially outwardly to produce the spokes. The outer ends of these spokes are suitably secured to the rim member 49 as by welding.

As shown in Figure 12, the spokes 50 which correspond to the spokes 45 of Figures 10 and 11 have outer closed ends 51 which are suitably secured to the rim member 52 as by welding or riveting. By forming these spokes with their outer ends closed, drawing of the spokes from the outer hub member is facilitated.

Figure 13 shows a modification of Figures 1 and 2 in which the tubular spokes 53 have their walls of substantially uniform thickness throughout. The inner ends of these spokes abut the tubular portions 54 of the outer hub member 55, these tubular portions forming the inner end portions of the spokes of the wheel and preferably having walls of greater thickness than the walls of the tubular spokes. The peripheral faces of the outer ends of the tubular portions register with the peripheral faces of the inner ends of the tubular spokes and the spokes are preferably secured to the tubular portions by welding.

Figures 14 and 15 disclose a modification of Figure 13 differing essentially in the mounting of the sheet metal wheel. In detail, the outer hub member 56 of the demountable wheel has the inwardly extending mounting portion 57 which latter forms a continuation of the rear wall of the annular portion 58 of the outer hub member. This mounting portion has the radially inwardly extending portion 59, the forwardly extending tubular portion 60 connected to the portion 59 and the radially inwardly extending portion 61 connected to the front end of the portion 60. The tubular portion 60 has the tapered seat 62 which is substantially in the median plane of the demountable wheel and which is formed by outwardly and rearwardly flaring a part of the tubular portion and this tapered seat is engageable with a corresponding tapered seat upon the radially extending portion 63 of the inner hub member 64. The front radially extending portion 61 is resilient and formed with the annular series of rearwardly extending tapered driving projections 65 which are engageable in correspondingly shaped recesses 66 in the inner hub portion 63. Suitable nuts 67 threaded upon the studs secured to the inner hub member and having tapered noses engaging the driving projections and adapted to flex the radially extending portion 61 and detachably secure the wheel to the inner hub member.

In the modifications shown in Figures 16, 17 and 18, the inwardly extending mounting portion of the demountable wheel extends radially inwardly from and forms a continuation of the front wall of the annular portion of the outer hub member and this mounting portion at its point of attachment to the inner hub member is so positioned relative to the median plane of the demountable wheel that when the latter is mounted upon the inner hub member it may have the desired relation to the inner hub member to secure the desired tread. In detail, and as shown in Figure 16, the mounting portion 68 is in the nature of an inwardly extending annular flange forming a continuation of the front wall of the annular portion 69 of the outer hub member 70. This mounting portion has the central rearwardly offset part 71 which is engageable with the front side of the radially extending fixed flange 72 of the inner hub member 73. As shown in Figure 17, the mounting portion 74 has the central part 75 which is substantially in the same plane as the outer part of the mounting portion. Figure 18 discloses the central part 76 of the mounting portion 77 of the outer hub member as rearwardly offset to contact with the radially extending fixed flange of the inner hub member in substantially the median plane of the demountable wheel and formed with the annular series of tapered driving projections 78 engageable in correspondingly shaped recesses in the fixed flange.

What I claim as my invention is:

1. An artillery wheel comprising inner and outer stampings having axially opposite radial spoke portions cooperating to form spokes of hollow section, said inner stamping having a central mounting portion for attachment to a hub, said mounting portion forming the sole means for assuming all of the wheel load, said outer stamping being carried by said inner stamping and having a nave extending generally axially outwardly of said mounting portion in spaced relation to said mounting portion and the hub, and means upon said nave for carrying a hub cap in spaced relation to the hub.

2. An artillery wheel comprising a hub member, a rim member, inner and outer stampings each having a central portion and spoke portions radiating from said central portions, said spoke portions being axially opposite and in secured relation to each other, said inner stamping having its central portion connected to said hub member and its spoke portions connected to said rim member and said outer stamping having its central portion extending generally axially from the central portion of said inner stamping and in spaced relation thereto and also to said hub member.

3. An artillery wheel comprising a hub member, a rim member, a pair of stampings having substantially the same outer diameters, each stamping having a central portion and spoke portions radiating from said central portion, one of said stampings having its central portion connected to said hub member and its spoke portions connected to said rim member and the other of said stampings having its spoke portions registering with those of the first mentioned stamping, and its central portion extending generally axially from the central portion of the other of said stampings in spaced relation thereto and also to said hub member.

4. A wheel comprising a hub member, a rim member, inner and outer stampings each having a central portion and spoke portions radiating from said central portion, said spoke portions being axially opposite and in secured relation to each other, said inner stamping having its central portion connected to said hub member and being peripherally connected to said rim member, and said outer stamping having its central portion extending generally axially from the central portion of said inner stamping radially outwardly of its zone of attachment to the hub member and also freely with respect to both said mounting portion and said hub member.

5. A wheel comprising a hub member, a rim member, a pair of stampings having substantially the same outer diameters, each stamping having a central portion and spoke portions radiating from said central portion, one of said stampings having its central portion connected to said hub member and being peripherally connected to said rim member, and the other of said stampings having its spoke portions registering with those of the first mentioned stamping and its central portion extending generally axially from the central portion of the other of said stampings freely with respect to both said mounting portion and said hub member.

6. A wheel comprising inner and outer members each having a central portion and spoke portions radiating from and integral with said central portion, said spoke portions being axially opposite and in secured relation to each other, said inner member having its central portion constructed and arranged for attachment to a hub member and its periphery constructed and arranged for attachment to a rim member, and said outer member having its central portion extending generally axially from the central portion of said inner member radially outwardly of its zone of attachment to the hub member and also freely with respect to both said mounting portion and the hub member.

7. An artillery wheel comprising inner and outer stampings including axially-opposite radial spoke portions cooperating to form spokes of hollow section, the outer stamping constituting substantially only a fairing free from the wheel load.

CHARLES W. SINCLAIR.